United States Patent
Watanabe et al.

(10) Patent No.: US 11,120,831 B1
(45) Date of Patent: Sep. 14, 2021

(54) COMPENSATION FOR EXPANSION AND CONTRACTION ACROSS THE WIDTH OF A MAGNETIC TAPE

(71) Applicant: International Business Machines Corporation, Armonk, NY (US)

(72) Inventors: Junta Watanabe, Tokyo (JP); Hironobu Nagura, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/001,710

(22) Filed: Aug. 25, 2020

(51) Int. Cl.
| | | |
|---|---|---|
| *G11B 15/43* | (2006.01) | |
| *G11B 15/093* | (2006.01) | |
| *G11B 5/588* | (2006.01) | |
| *G11B 5/584* | (2006.01) | |
| *G11B 5/55* | (2006.01) | |

(52) U.S. Cl.
CPC ............ *G11B 15/43* (2013.01); *G11B 15/093* (2013.01); *G11B 5/5517* (2013.01); *G11B 5/584* (2013.01); *G11B 5/588* (2013.01)

(58) Field of Classification Search
None
See application file for complete search history.

(56) References Cited

U.S. PATENT DOCUMENTS

| | | |
|---|---|---|
| 7,167,332 B2 | 1/2007 | Bartlett |
| 7,962,763 B2 | 6/2011 | Trezise et al. |
| 9,183,863 B2 | 11/2015 | Herget |
| 10,110,257 B2 * | 10/2018 | Katagiri ............ H03M 13/2957 |
| 10,276,204 B1 | 4/2019 | Judd et al. |
| 2005/0248869 A1 * | 11/2005 | Bartlett ................... G11B 15/05 360/31 |
| 2006/0092547 A1 | 5/2006 | Kawakami et al. |
| 2007/0180272 A1 * | 8/2007 | Trezise ............... G06F 21/6209 713/193 |

(Continued)

OTHER PUBLICATIONS

"Stop Write on Tape Dimension Changes", An IP.com Prior Art Database Technical Disclosure, Disclosed Anonymously, IP.com No. IPCOM000229972D, Electronic Publication Date Aug. 10, 2013, 4 pages, <https://priorart.ip.com/IPCOM/000229972>.

(Continued)

*Primary Examiner* — Tan X Dinh
(74) *Attorney, Agent, or Firm* — Stephen R. Yoder; Edward J. Wixted, III

(57) ABSTRACT

A computer data storage system receives a plurality of data units from a host computer. The system stores the data units in a buffer memory. The system generates a plurality of data segments comprising a plurality of subsets of the plurality of data units. The system receives a plurality of dataset information tables (DSITs) corresponding to the plurality of data segments. The system appends the plurality of DSITs to the respectively corresponding plurality of data segments, to create a plurality of datasets stored in the buffer memory. The system determines a number of datasets stored in the buffer memory, exceeds a threshold value. And in response to determining the number of datasets, of the plurality of datasets stored in the buffer memory, exceeds the threshold value, the system stops the appending the plurality of DSITs to the respectively corresponding plurality of data segments.

20 Claims, 7 Drawing Sheets

(56) References Cited

U.S. PATENT DOCUMENTS

| | | | |
|---|---|---|---|
| 2009/0271544 A1* | 10/2009 | Oishi | G06F 3/0613 |
| | | | 710/53 |
| 2011/0116185 A1* | 5/2011 | Katagiri | G11B 20/10527 |
| | | | 360/73.04 |
| 2012/0002317 A1* | 1/2012 | Hirata | G11B 20/18 |
| | | | 360/48 |
| 2012/0079185 A1 | 3/2012 | Abe et al. | |
| 2015/0193304 A1* | 7/2015 | Katagiri | G11B 20/1833 |
| | | | 714/764 |

OTHER PUBLICATIONS

IBM, "IBM 3592 Drive Microcode Fix List", Printed Nov. 29, 2019, 1 page, <https://delivery04.dhe.ibm.com/sar/CMA/STA/08Iwa/0/3592_60F_59B_fixlist.txt>.

IBM, "IBM 3592 Drive Microcode Fix List", Printed Nov. 29, 2019, 2 pages, <https://delivery04.dhe.ibm.com/sar/CMA/STA/08Iw6/0/3592_E08_A14_fixlist.txt>.

IBM, "Select Fixes—Tape Drives TS1155 Tape Drive (3592-55F) (All Platforms)", IBM Support: Fix Central, Released Date Nov. 13, 2019, 9 pages, <https://www-945.ibm.com/support/fixcentral/swg/selectFixes?parent=Tape%20drives&product=ibm/Storage_Tape/TS1155+Tape+Drive&release=1.0&plafform=All&function=all>, Grace Period Disclosure Document.

IBM, "Select Fixes—Tape Drives TS1160 Tape Drive (3592-60F, 60G) (All platforms)", IBM Support : Fix Central—Released Date Nov. 13, 2019, 7 pages, <https://www-945.ibm.com/support/fixcentral/swg/selectFixes?parent=Tape%20drives&product=ibm/Storage_Tape/TS1160+Tape+Drive&release=1.0&platform=All&function=all>, Grace Period Disclosure Document.

\* cited by examiner

COMPENSATION FOR EXPANSION AND CONTRACTION ACROSS THE WIDTH OF A MAGNETIC TAPE

STATEMENT REGARDING PRIOR DISCLOSURES BY THE INVENTOR OR A JOINT INVENTOR

The following disclosure(s) are submitted under 35 U.S.C. 102(b)(1)(A): IBM, "Select Fixes-Tape Drives TS1155 Tape Drive (3592-55F) (All Platforms)", IBM Support: Fix Central, Released Date Nov. 13, 2019, 9 pages, <https://www-945.ibm.com/support/fixcentral/swg/selectFixes?parent=Tape %20drives&product=ibm/Storage_Tape/TS1155+Tape+Drive&release=1.0&platform=All&function=all>, Grace Period Disclosure Document.

IBM, "Select Fixes-Tape Drives TS1160 Tape Drive (3592-60F, 60G) (All platforms)", IBM Support: Fix Central-Released Date Nov. 13, 2019, 7 pages, <https://www-945.ibm.com/support/fixcentral/swg/selectFixes?parent=Tape %20drives&product=ibm/Storage_Tape/TS1160+Tape+Drive&release=1.0&platform=All&function=all>, Grace Period Disclosure Document.

BACKGROUND

The present invention relates generally to the field of physical storage media, and more particularly to accounting for tape media expansion and contraction.

When a tape drive reads or writes data on a tape medium, multiple read/write heads perform the operation on multiple tracks at the same time. On a tape medium, a track is a data recording region on the tape surface, generally parallel to the tape edge. During read and write operations, a tracking procedure attempts to insure that the read/write heads are accurately positioned relative to the tracks.

A tape medium may expand or contract, for example over long term storage, due to temperature and humidity influences. Expansion or contraction across the width of the tape may affect read/write head alignment accuracy with respect to the corresponding data tracks. Moreover, the width of the tape may further be affected by tension in the tape during read and write operations, where increased tension may be accompanied by a decrease in the tape width (and vice versa), and subsequent change in the track positions relative to the read-write heads.

SUMMARY

According to an aspect of the present invention, there is a method, computer program product and/or system that performs the following operations (not necessarily in the following order): (i) receiving a plurality of data units from a host computer; (ii) storing the plurality of data units in a buffer memory; (iii) generating a plurality of data segments comprising a respectively corresponding plurality of subsets of the plurality of data units; (iv) receiving a plurality of dataset information tables (DSITs) respectively corresponding to the plurality of data segments; (v) appending the plurality of DSITs to the respectively corresponding plurality of data segments, to create a plurality of datasets stored in the buffer memory; (vi) determining a number of datasets, of the plurality of datasets stored in the buffer memory, exceeds a threshold value; (vii) in response to determining the number of datasets exceeds the threshold value, stopping the appending the plurality of DSITs to the respectively corresponding plurality of data segments; and (viii) in further response to determining a number of datasets, of the plurality of datasets stored in the buffer memory, exceeds the threshold value, writing the datasets onto a storage medium.

DETAILED DESCRIPTION

Figure 1A:
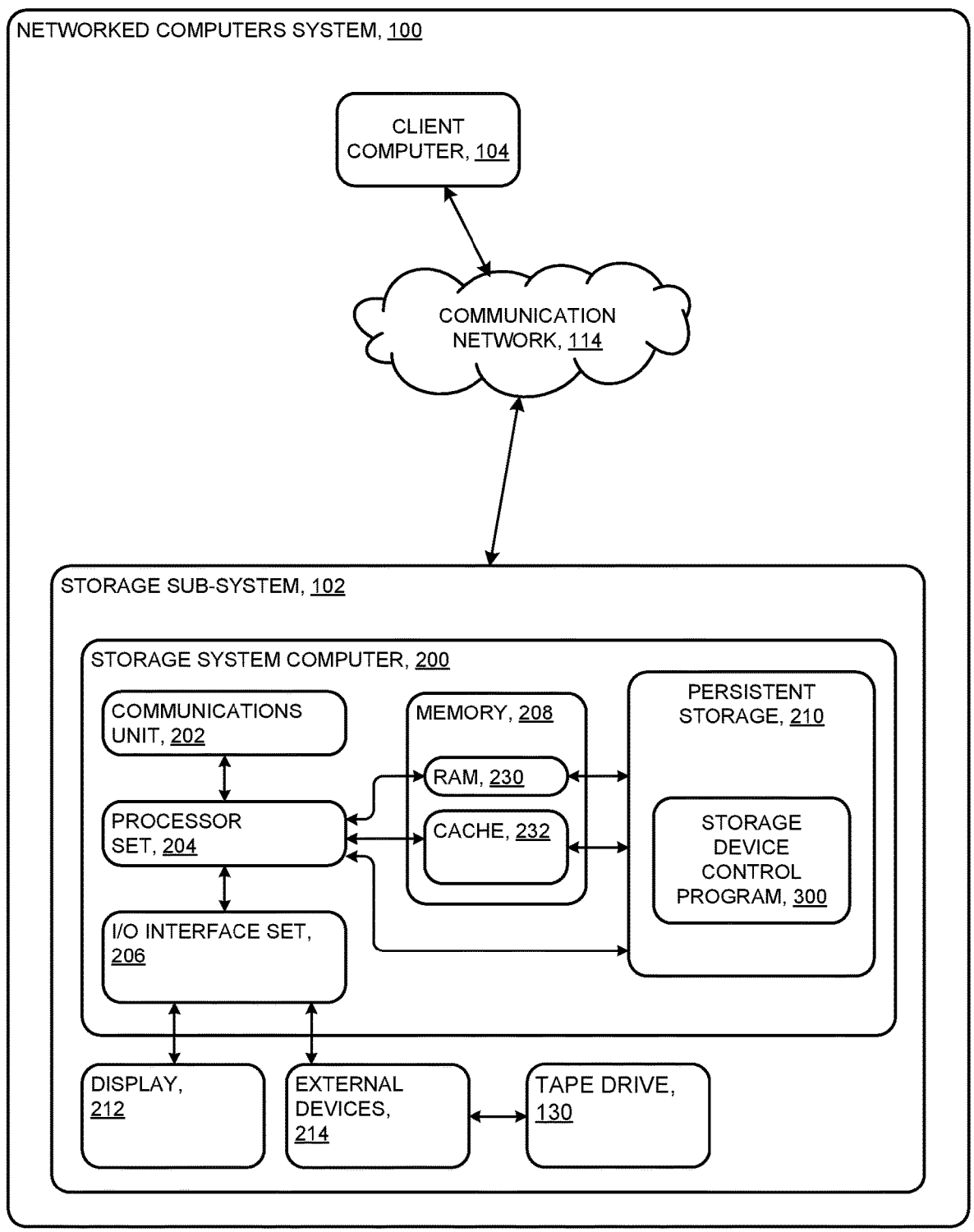
FIG. 1A is a block diagram of a system in accordance with at least one embodiment of the present invention.

In some embodiments of the present invention, a dataset comprises one or more data segments. A tape drive unit, in conjunction with writing a data segment to the tape medium, also writes a dataset information table (DSIT) associated with the segment. The DSIT includes information with respect to a tape expansion/shrinkage measurement. For each data segment, the tape drive unit stores a corresponding DSIT. Thus, the tape drive reduces (when compared to conventional tape storage systems) a gap between a position on the tape medium where the tape drive measures expansion/shrinkage of the tape medium, and a position where the associated data segment is written.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to FIGS. 1A and 1B. FIG. 1A is a functional block diagram illustrating various portions of networked computers system 100, including: storage sub-system 102; client computer 104; communication network 114; tape drive 130; storage system computer 200; communications unit 202; processor set 204; input/output (I/O) interface set 206; memory device 208; persistent storage device 210; display device 212; external devices 214; random access memory (RAM) devices 230; cache memory device 232; and storage device control program 300.

Storage sub-system 102 is, in many respects, representative of the various computer sub-system(s) in the present invention. Accordingly, several portions of storage subsystem 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Storage device control program 300 is a collection of machine readable instructions and/or data that is used to create, manage, and control certain software functions that will be discussed in detail, below, in the Example Embodiment sub-section of this Detailed Description section.

Storage sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 214 may be able to supply, some or all, memory for storage sub-system 102; and/or (ii) devices external to storage sub-system 102 may be able to provide memory for storage sub-system 102.

Storage device control program 300 is stored in persistent storage device 210 for access and/or execution by one or more of the respective computer processor set 204, usually through one or more memories of memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Storage device control program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communications unit 202, in these examples, provides for communications with other data processing systems or devices external to storage sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with storage system computer 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, storage device control program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1B:
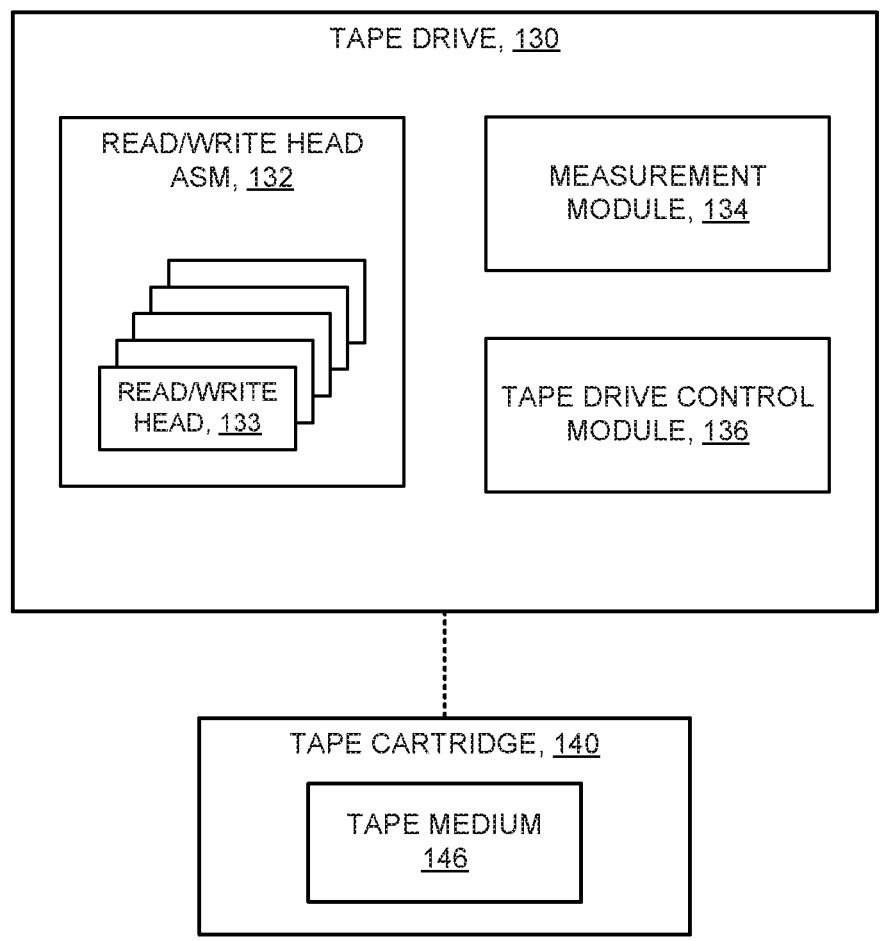
FIG. 1B is a block diagram of a portion of a storage system in accordance with at least one embodiment of the present invention.

FIG. 1B is a functional block diagram further illustrating an embodiment of a possible hardware and software environment for software and/or methods according to the present invention. FIG. 1B illustrates various portions of tape drive 130, including: read/write head assembly 132, measurement module 134, tape drive control module 136, tape cartridge 140, and tape medium 146.

II. Example Embodiment

Figure 2:
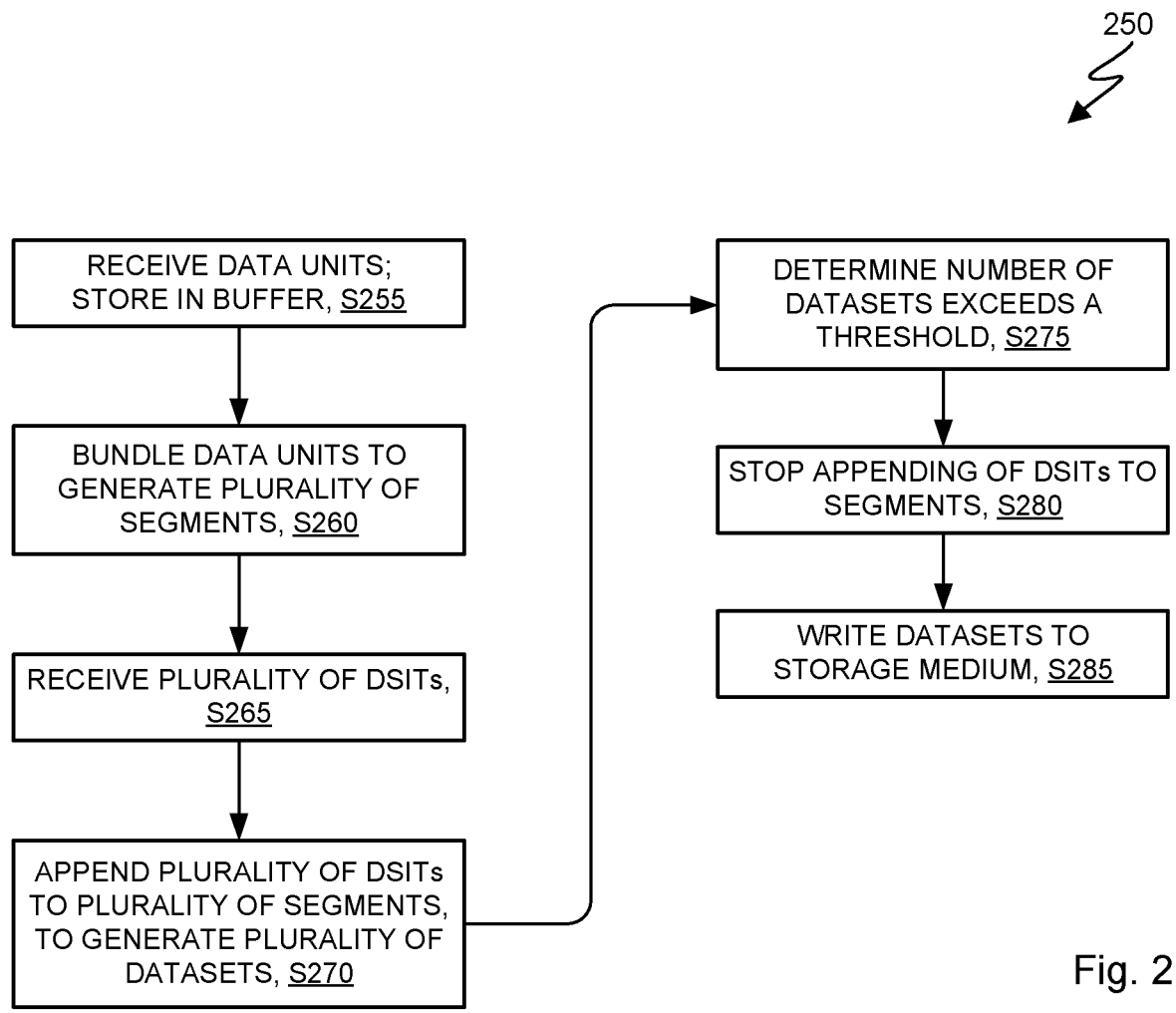
FIG. 2 is a flowchart showing a method performed, at least in part, in accordance with at least one embodiment of the present invention.
Figure 3:
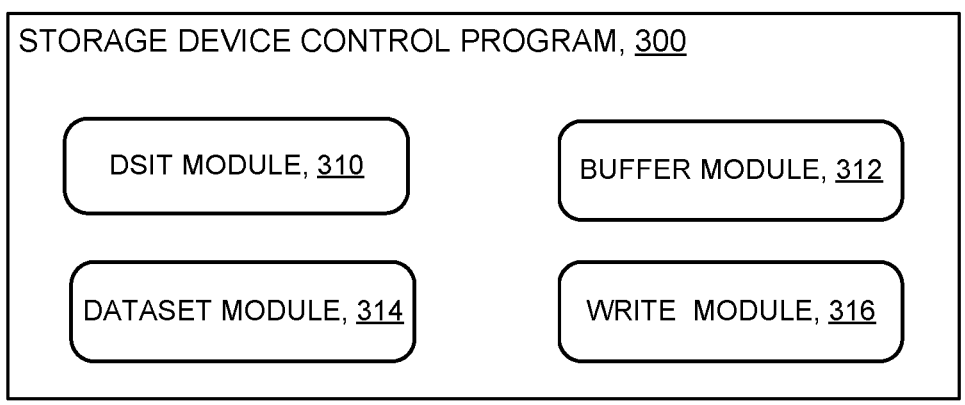
FIG. 3 is a block diagram showing a machine logic (for example, software) portion of a system in accordance with at least one embodiment of the present invention.

FIG. 2 shows flowchart 250 depicting a method according to the present invention. FIG. 3 shows storage device control program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where buffer module 312, of storage device control program 300, receives a plurality of data units from a host computer. Each data unit may be any type of data such as (without limitation) a document file, an image file, a complete database or subset thereof, a media file (such as a movie or audio file), a server log, a hard disk backup image, a software product, a system dump, etc. Buffer module 312 stores the data units in a write buffer.

Processing proceeds at operation S260, where dataset module 314 selects a subset of data units received in operation S255, and bundles the selected data units into a data segment. A data segment may contain one or more data units, or even just a portion of a single data unit. In some embodiments of the present invention, dataset module 314 selects the data units for bundling into a data segment, based on one or more of the following factors or criteria (without limitation): (i) size of each data unit; (ii) size of the resulting data segment; (iii) time each data unit is received; (iv) order in which the data units are received; (v) storage job priority associated with a data unit; (vi) relationship of the data unit with other data units (for example, data units that are associated with each other in some way may be bundled together into a data segment); (vii) available free space on the destination physical storage medium; (viii) the type of designated destination physical storage medium, etc.

Processing proceeds at operation S265, where DSIT module 310, of storage device control program 300, receives a dataset information table (DSIT) corresponding to each data segment bundled in operation S260. The DSIT includes measurement information with respect to physical condition of the storage medium on which the data segment is to be stored.

Physical condition of the storage medium may be related to various physical properties such as a measure of expansion or contraction of the storage medium relative to a reference measure established at another time (such as at manufacture, a time when the servo tracks were laid down onto the medium, or at a previous instance when the storage medium had been in a read/write device, etc.). A DSIT corresponding to a particular data segment includes information with respect to the storage medium condition at, or sufficiently near to the physical location on the storage medium where the particular data segment is to be written, as to be meaningful in the context of the present invention.

Processing proceeds at operation S270, where DSIT module 310 appends a plurality of DSITs to a respectively corresponding plurality of data segments, to generate a respectively corresponding plurality of datasets to be written onto the storage medium. In some embodiments, a DSIT corresponding to a given data segment is generated (and appended to a corresponding data segment to create a dataset) (i) once the location on the storage medium, for writing the given data segment, has been determined, and (ii) once data relevant to the physical condition of the storage medium has been measured or otherwise determined.

Processing proceeds at operation S275, where dataset module 314 determines that a number of datasets in the buffer, awaiting writing to the storage medium, exceeds a lower threshold established to help ensure moving the data to the storage medium proceeds without interruptions (associated with emptying of the buffer) and consequent back hitches of the storage medium.

Processing proceeds at operation S280, where in response to determining that a number of datasets in the buffer exceeds an upper threshold, DSIT module 310 stops appending DSITs to segments.

Processing proceeds at operation S285, where in further response to determining that a number of datasets in the buffer exceeds the upper threshold (see operation S280 above), write module 316 writes the datasets to the storage medium (and in conjunction, deletes the datasets from the buffer). Once a sufficient number of datasets have been deleted from the buffer such that the number of datasets remaining in the buffer falls below the lower threshold, DSIT module 310 resumes appending DSITs to the segments.

III. Further Comments and/or Embodiments

Some embodiments of the present invention may recognize one, or more, of the following facts, potential problems, and/or potential areas for improvement with respect to the current state of the art: (i) tape medium tension compensation includes steps of: (a) (when writing a dataset to a tape) measuring expansion or shrinkage of the tape at a position for writing the dataset, (b) writing the measurement data in conjunction with writing the dataset, (c) reading the measurement data in conjunction with reading the dataset, and (d) adjusting the tension of the tape to cause the tape to expand or contract to the same degree (as it was when the dataset was written) thereby performing tracking at the same position(s) as when the dataset was written; (ii) there is a gap between the tape position where the measurement is performed and the tape position where the measurement data is written; (iii) the gap makes it difficult to achieve optimal tension compensation; and/or (iv) there may exist a time delay between the respective times of when the measurement data and the dataset are written.

Further with respect to item (i)(a) in the paragraph above, in some embodiments of the present invention, a tape drive measures the state of expansion or shrinkage of the tape (for example, by determining the spacing between the tracks on the tape) by referencing signal strength coming from the various heads as they seek and read from servo tracks. The tape drive controller determines alignment and spacing of the read/write heads (sometimes herein referred to simply as "heads") relative to track positioning on the tape, based at least in part, on: (i) differences in the signal strengths from one head vs. another; and/or (ii) changes in the signal strengths as the heads seek alignment with the servo tracks. For example, if the tape media has expanded or contracted relative to a previously determined reference value (since the servo tracks have been laid down) such that the servo tracks are farther apart or closer together than the heads, then while slewing the head assembly to seek alignment with the tracks, the signal strength coming from a head approaching best alignment may be increasing, while simultaneously, signal strength coming from a head that has already passed best alignment may be decreasing. In some embodiments, this differential in the changing relative signal strengths coming from the heads (while seeking alignment) is a basis for determining: (i) a measure of tape expansion or contraction; (ii) a measure of head assembly-to-track alignment; and/or (iii) a correction factor useful for compensating (such as by modifying tape media tension) for the degree of expansion or contraction of the tape media. More generally stated, some embodiments of the present invention provide a correction factor useful for compensating for certain types of misalignment between the read/write heads and respectively corresponding tracks on the tape media, regardless of the cause for the misalignment.

In some embodiments, alignment of the plurality of read/write heads relative to respectively corresponding track positions on the tape, is expressed as a composite value such as (without limitation): (i) a root-mean-square value based on a plurality of misalignment values between the heads and the tracks on the tape; (ii) a range expressed algebraically (meaning taking into account misalignment in one direction vs. the opposite) as the difference between the greatest misalignment measurement and the least misalignment; (iii) an algebraic sum of the misalignment measurement values; and/or (iv) a sum of the absolute values of the misalignment measurements. In some embodiments, the misalignment values are expressed as dimensional values. In other embodiments, the misalignment values are expressed in terms of signal strengths generated by the heads. In yet other embodiments, the misalignment values are derived from head positioning control system parameters, such as closed loop error signals.

Some embodiments of the present invention may include one, or more, of the following features, characteristics, and/or advantages: (i) create one dataset information table (DSIT) per dataset; (ii) write the DSIT immediately before writing the dataset, thereby reducing the difference between the tape position where the DSIT is created and the tape position where the corresponding dataset is actually written; (iii) count the number of contiguous segments for which respectively corresponding DSITs have been created; (iv) count the number of segments in the buffer memory that are ready for writing to tape when creating the DSIT; (v) continue creation of DSITs until the counted number reaches a threshold value.

Figure 4B:
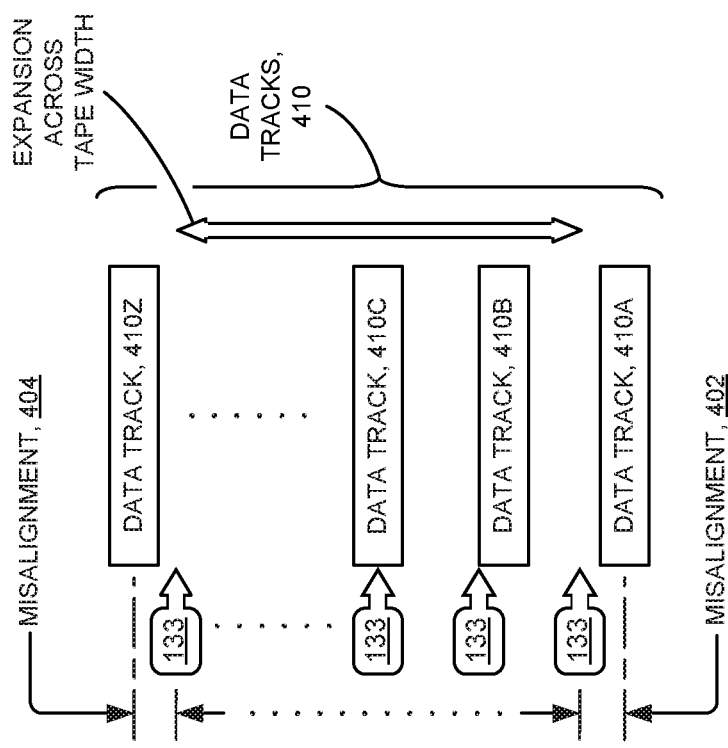
FIG. 4B is a block diagram showing an aspect of a tape drive system in accordance with at least one embodiment of the present invention.
Figure 4A:
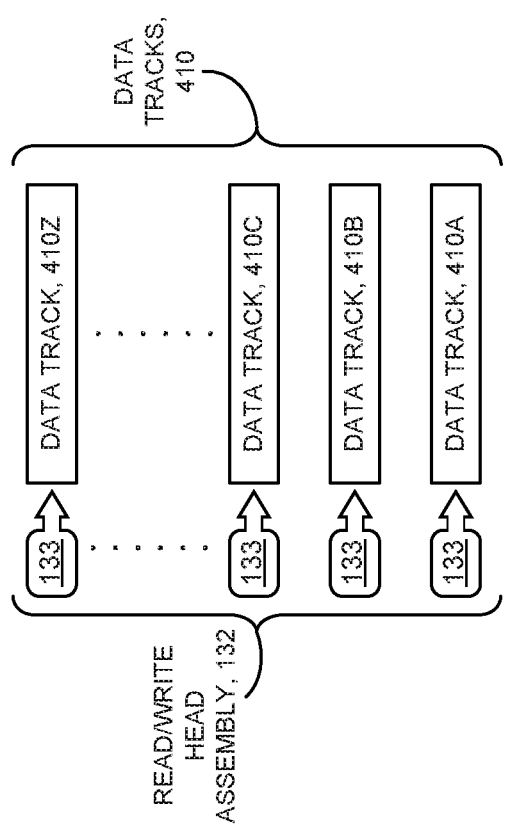
FIG. 4A is a block diagram showing an aspect of a tape drive system in accordance with at least one embodiment of the present invention.

FIGS. 4A and 4B (not to scale) illustrate positioning of read write head assembly 132 in relation to data tracks 410 on tape medium 146 (see FIG. 1B). Data tracks 410 comprise data tracks 410A, 410B, . . . 410Z. In some embodiments, data tracks 410 comprise servo tracks that tape drive control module 136 (see FIG. 1B) uses in seeking and/or controlling head alignment.

In FIG. 4A, a plurality of individual read/write heads 133, of read/write head assembly 132, are aligned with a respectively corresponding plurality of data tracks on the tape. In FIG. 4B, some read/write heads 133 (for example misalignment 402 and misalignment 404) are out of alignment with the data tracks. Misalignment can be caused by several factors such as expansion/contraction across the width of the tape, expansion/contraction of read/write head assembly 132, disparate thermal expansion coefficients between the tape medium and the read/write head assembly, manufacturing variabilities, etc.

In some embodiments, read/write head-to-track misalignment is detected by the relative signal strengths generated at the read/write heads 133. A read/write head that is properly aligned with the corresponding data track or servo track may produce the strongest signal (for example, highest signal to noise ratio), whereas a head that is misaligned may generate a relatively weaker signal or have a lower signal to noise ratio.

In some embodiments, the tape drive measures tape expansion/contraction in an indirect manner. One such indirect expansion/contraction measurement method involves determining spacing between tracks on the tape, relative to spacing of respectively corresponding read/write heads on the tape drive read/write head assembly.

Expansion/contraction across the width of the tape (or stated more generally, mismatch between the spacing of read/write heads 133 and spacing of data tracks on tape medium 146) may be influenced by the following factors (among others, without limitation) with respect to both the tape medium and read/write head assembly 132: (i) temperature; (ii) humidity; (iii) material stability characteristics over time; (iv) tension in the tape medium; (v) head position control system (not shown in the Figures) performance; (vi) manufacturing tolerances and variabilities, with respect to locations of read/write heads 133 within read/write head 132, and locations of servo tracks and/or data tracks on tape medium 146, etc.

In some embodiments of the present invention, when a certain number of contiguous segments, for which DSITs have been created, and segments ready for writing to tape are present in the write buffer memory, no further DSITs are created (for a given write cycle). The gap between the position where a DSIT is created (where measurement related to tape tension is taken) and the position where the dataset is actually written, is reduced, as compared to some conventional methods. Further, the write buffer memory is emptied (due in part the rate of data outflow from the buffer exceeding the rate of data inflow into the buffer) less frequently during a writing session (or not at all, except when reaching the end of a writing session). Consequently, there is less need (or no need at all) for back hitches associated with occurrences of an empty buffer.

Figure 5:
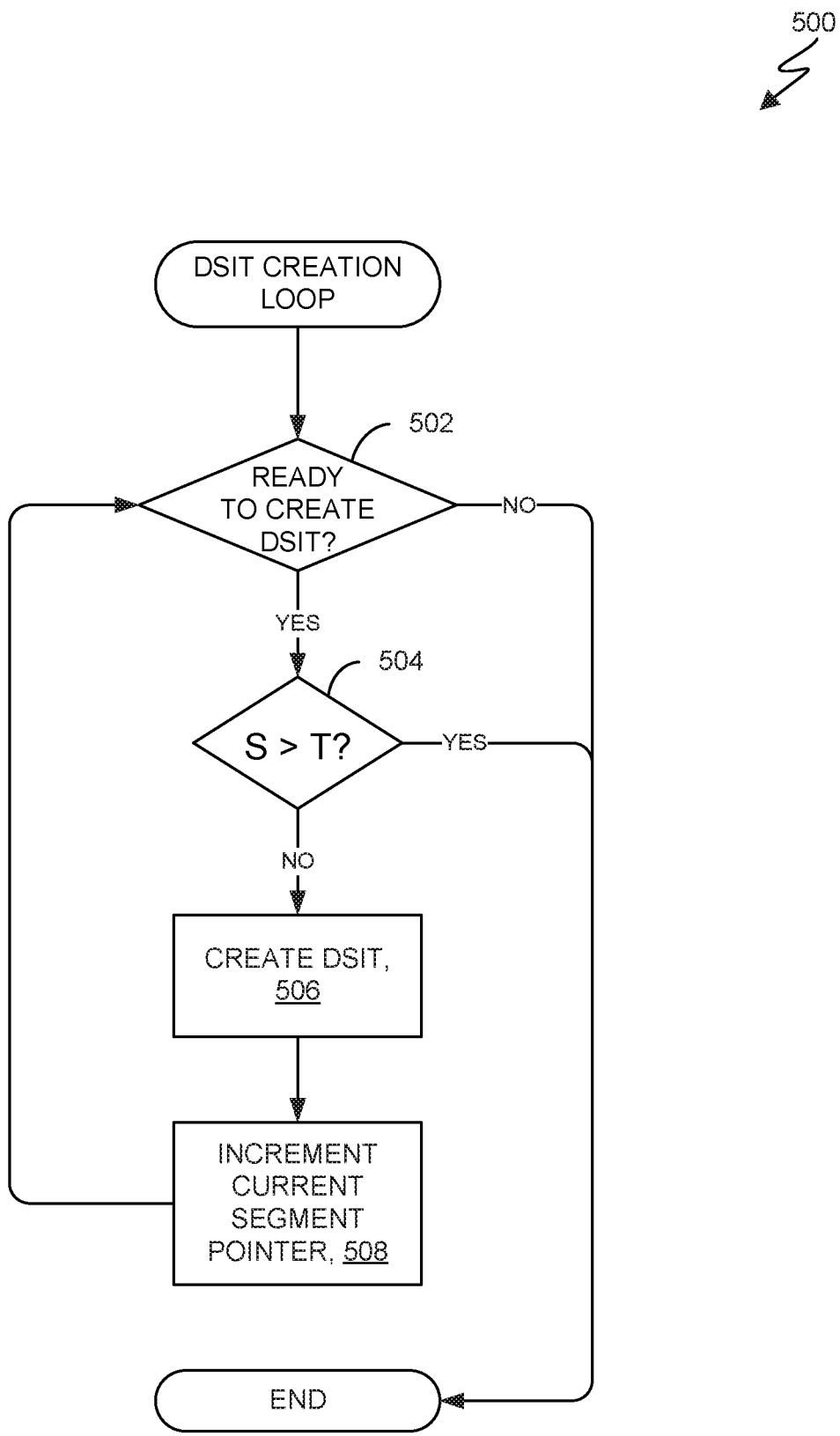
FIG. 5 is a flowchart showing a method performed, at least in part, in accordance with at least one embodiment of the present invention.

Flowchart 500 of FIG. 5 shows a DSIT creation loop method in accordance with some embodiments of the present invention.

Processing begins at decision 502 where DSIT module 310 (see FIG. 3) determines whether DSIT module 310 is ready to create a dataset information table (DSIT) based, at least in part, on the volume and/or nature of data present in the write buffer (not shown in the Figures), in view of certain DSIT configuration parameters. Once DSIT module 310 determines that there are one or more data segments present in the write buffer, DSIT module 310 then determines whether a DSIT associated with the one or more data segments is to be created. In some embodiments, this determination is based, at least in part on certain DSIT configuration parameters, such as the number of contiguous segments (meaning segments that are to be laid out contiguously on tape medium 146, see FIG. 1B) present in the write buffer.

In some embodiments, a DSIT is associated with a single data segment (sometimes herein referred to simply as a segment). In some embodiments, a segment is limited to a fixed maximum size. If a file, to be written to tape medium 146, exceeds the maximum size limit, the file is divided into a number of contiguous segments, each of which does not exceed the size limit. In other embodiments, a DSIT is association with: (i) a fixed number of contiguous segments; and/or (ii) one or more contiguous data segments that together add up to an acceptable size in terms of bytes. In still other embodiments, the segment size limit is based on the length of tape medium 146 needed to store the segment. The length of tape medium 146 needed for a given segment is based, at least in part, on the byte size of the segment and the recording density (bytes per millimeter per track, for example) on tape medium 146. In yet other embodiments, the segment size is limited so as not to exceed available free space remaining on the tape medium.

If DSIT module 135 determines that DSIT module 135 is not ready to create a DSIT (decision 502, "No" branch), processing ends. This may mean there are no data segments currently in the write buffer, and is consequently meaningless to create a DSIT.

If DSIT module 135 determines that DSIT module 135 is ready to create a DSIT (decision 502, "Yes" branch), processing proceeds at decision 504, where DSIT module 135 determines whether the number of contiguous segments (comprising segments for which DSITs have been created and the segments are ready for writing to tape (S)) is greater than a threshold value (T). In some embodiments, T is set to 1 (one), meaning a DSIT is generated for each segment ready for writing to tape. In some embodiments, T is set to a value greater than 1. If S is greater than T (decision 504, "Yes" branch), processing ends. In some embodiments, once processing in accordance with flowchart 500 ends, any DSITs and respectively corresponding data segments present in the write buffer are written to tape medium 146 and removed from the write buffer.

If S is not greater than T (decision 504, "No" branch), processing proceeds at operation 506, where DSIT module 135 creates a DSIT corresponding to the applicable segments (datasets and/or sub-datasets). In some embodiments, DSIT module 135 receives tape measurement data from measurement module 134 (see FIG. 1B). DSIT module 135 incorporates the tape measurement data into the DSIT.

In some embodiments, measurement module 134 bases the tape measurement data on one or more tape tension parameters active in tape drive 130 at a given moment in time proximate to writing of the associated data segment. Tape tension parameters may include, without limitation: (i) force data read from one or more transducers integrated with tape drive 130; (ii) control signal parameters associated with control of tape tension; and/or (iii) head-to-track alignment data, etc.

Processing proceeds at operation 508, where DSIT module 135 increments a current segment pointer (not shown in the Figures). The current segment pointer keeps track of which segment DSIT module 135 is currently processing.

Processing returns to decision 502.

Figure 6:
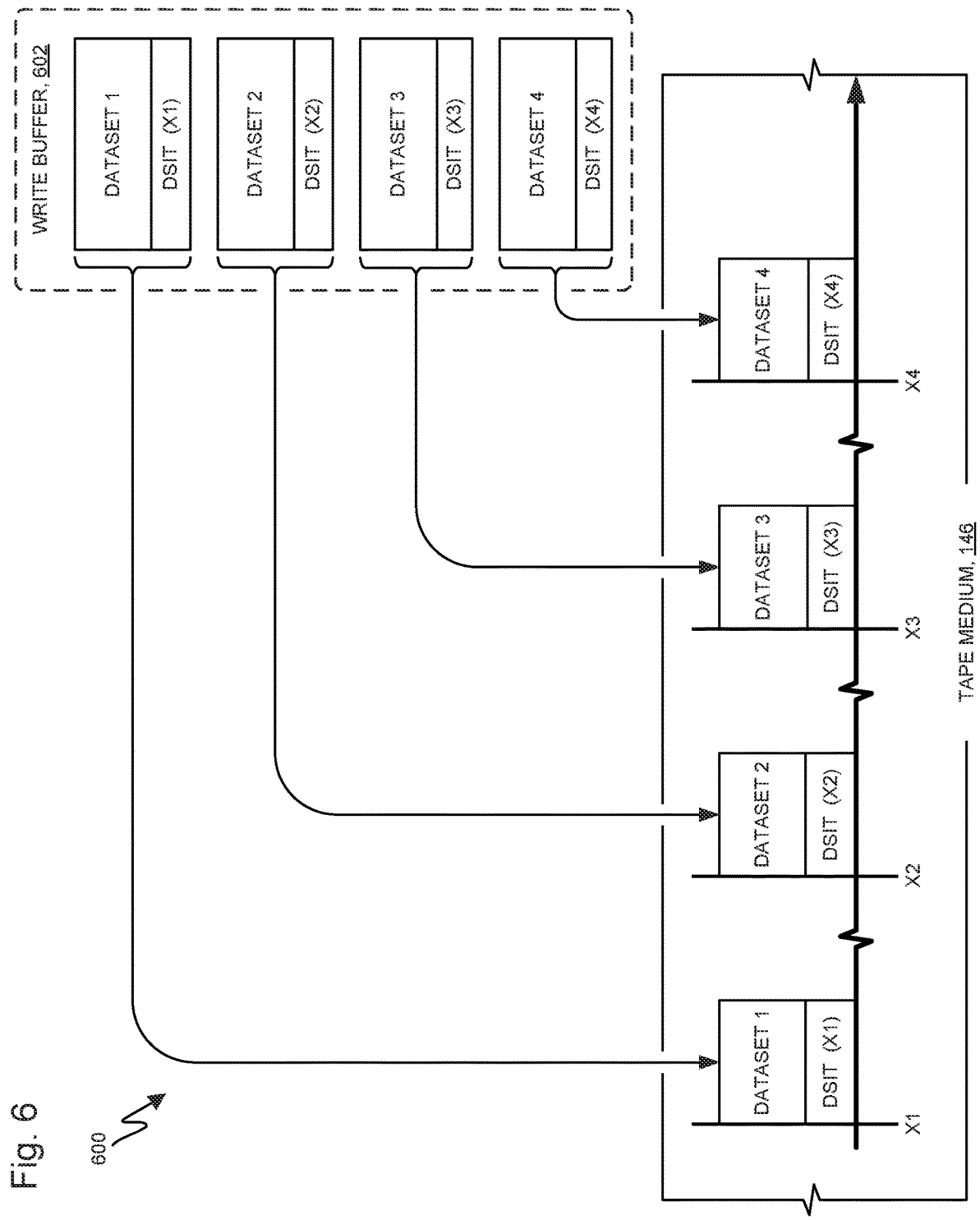
FIG. 6 block diagram showing an aspect of a tape drive system in accordance with at least one embodiment of the present invention.

Turning now to FIG. 6, dataset block diagram 600 schematically shows positioning of DSITs and respectively corresponding datasets (in some embodiments, a dataset comprises a plurality of data segments) along data tracks of tape medium 146. In the embodiment of dataset block diagram 600, a DSIT is associated with each dataset. This configuration corresponds to a value of T=1 at decision 504 of Flowchart 500 (see FIG. 5). As shown in FIG. 6, a DSIT corresponding to each dataset is written to write buffer 602. For example, DSIT (X1) corresponds to dataset 1, DSIT (X2) corresponds to dataset 2, etc.

In some embodiments, each DSIT includes tape measurement data taken at a place on the tape where the corresponding dataset is to be written. For example, tape drive 130 (see FIG. 1B) positions the tape at (or near) the place where writing of dataset 1 will begin (designated "X1" in FIG. 6). Measurement module 134 makes a tape expansion/contraction measurement(s) at location X1, and writes the resulting measurement(s) into DSIT (X1) in write buffer 602. Once ready to do so, tape drive 130 writes DSIT (X1) and dataset 1 to tape medium 146 (see FIG. 1B). In this way, the tape expansion/contraction data is written on tape medium 146 in close proximity to dataset 1, and in close proximity to the location on the tape medium where the expansion/contraction measurement(s) were determined. In similar fashion, tape drive 130 writes DSIT (X2) in close proximity to dataset 2. DSIT (X2) includes tape expansion/contraction data determined at position X2 on tape medium 146. The process continues for DSIT (X3) and DSIT (X4), respectively including expansion/contraction data determined at positions X3 and X4, and respectively written in close proximity to datasets 3 and 4. In this way, some embodiments reduce the gap between the position on the tape where the actual data is written and the position where the tape expansion/shrinkage measurement is taken.

Tape drive 130 may write the DSIT at any of the following positions on tape medium 146 with respect to the associated dataset: (i) the beginning of the dataset; (ii) interposed within the body of the dataset; (iii) on an available track along side of the dataset; (iv) and/or at the end of the dataset.

Figure 7:
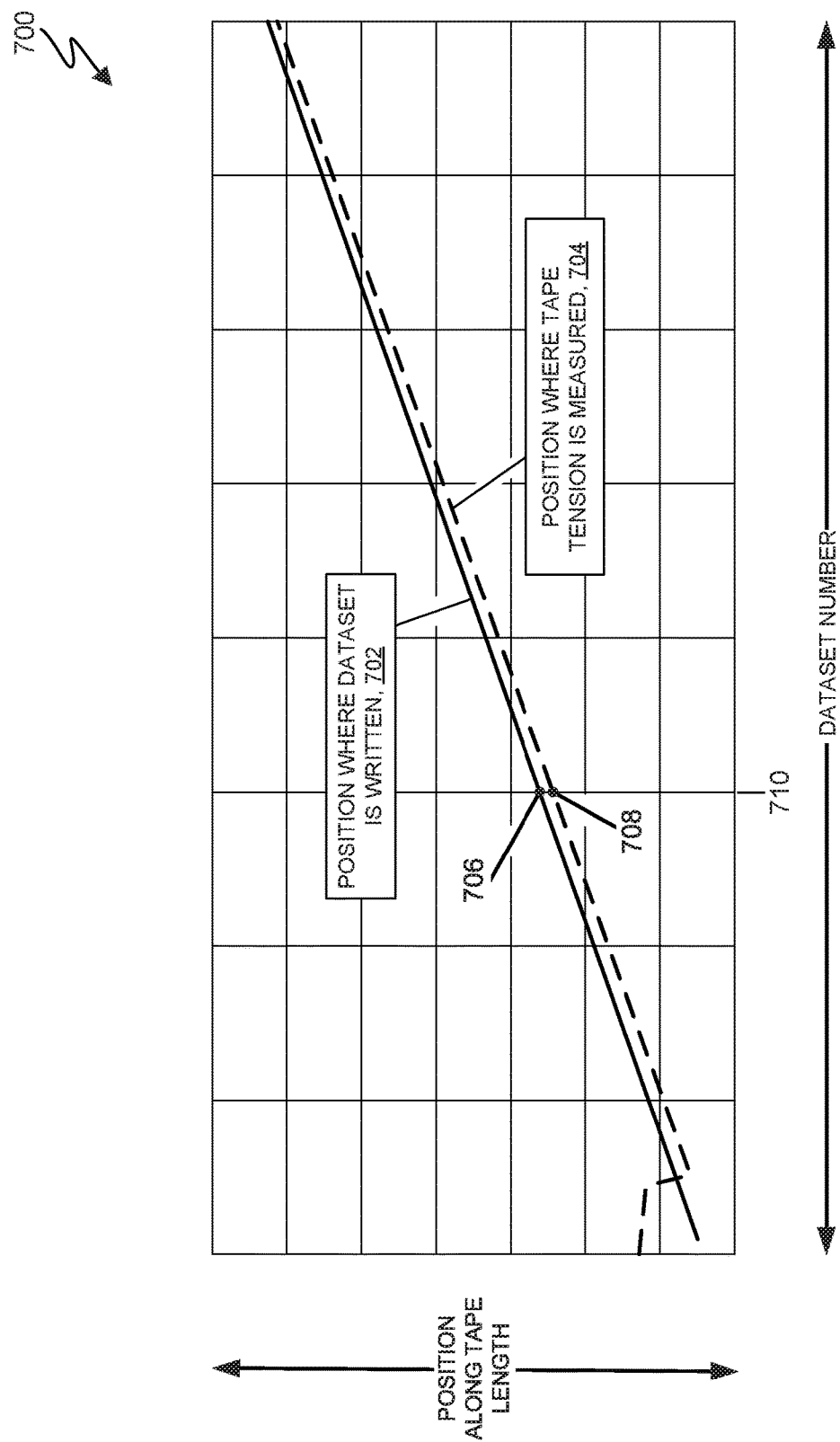
FIG. 7 is a graph showing an aspect of a tape drive system in accordance with at least one embodiment of the present invention.

Graph 700 of FIG. 7 shows a relationship between positions on tape medium 146 where tape drive 130 writes a dataset, and where tape drive 130 measures the tape tension (recorded in an associated DSIT), in accordance with some embodiments of the present invention. The horizontal axis of the graph represents dataset number. The vertical axis represents positions along the length of a tape medium. Solid line 702 represents position on the tape where a dataset is written. Dashed line 704 shows position on the tape where a tension measurement is taken. For example, data point 706 represents a starting position on the tape (vertical axis) of dataset 710 (horizontal axis). Data point 708 represents position on the tape where the tape tension, corresponding to dataset 710, was measured. The vertical gap between data points 706 and 708 represents the gap between the two aforementioned positions. Some embodiments of the present invention minimize this gap.

In some embodiments, once a read command, to read a dataset from the storage medium, is received, DSIT module 135 reads a DSIT associated with the dataset. Measurement module 134 (see FIG. 3) determines the present condition of the storage medium, such as tension, expansion/contraction condition, etc. Tape drive control module 136 (see FIG. 3) determines, based at least in part on information in the DSIT and the present condition of the storage medium, a correction factor, and applies a tension setting (increases, decreased or keeps the current tension setting) based on the correction factor. The tape drive control module 136 proceeds to read the first dataset from the storage medium in accordance with the read command.

Some embodiments of the present invention perform a method comprising: A method of generating datasets, the method executed by a tape drive that receives records (the smallest unit of data) sent from a host and writes the received records to a tape, the method comprising steps of: receiving a plurality of records from the host and storing the plurality of records in a buffer memory; organizing the plurality of records into sub-datasets (segments) each of which is composed of some of the plurality of records; and appending a Data Set Information Table (DSIT), which is a region where a degree of expansion or shrinkage of the tape is stored at the time of writing, to each of the bundles of the sub-datasets to create a dataset for writing; wherein when a sum of a number of the sub-datasets stored in the buffer memory and a number of the datasets exceeds a threshold value, the step of appending is stopped. Multiple sub-datasets are combined into one segment in buffer memory, and one or more sub-datasets with DSIT added becomes one data set. This method prevents the same DSIT from being added to all the sub-datasets until the threshold value is reached. Different DSITs can be added to sub-datasets. As a result, the tape positions associated with the data indicative of the degrees of expansion/shrinkage stored in the DSITs are accurate at the time of writing datasets.

During a read or write operation from or to a tape medium, performed by a tape drive unit, some embodiments of the present invention measure relative alignment between (i) a plurality of data tracks (and/or servo tracks) on the tape medium, and (ii) a respectively corresponding plurality of read/write heads of the tape drive unit. At least one measurement determines an amount of mismatch between the spacing of the plurality of tracks on the tape medium and the spacing of the respectively corresponding read/write heads of the tape drive unit. If a mismatch exceeds a threshold value, the tape drive unit modifies the tension applied to the tape medium. The tape tension in turn influences the spacing between the tracks thereon. That is, higher tension tends to decrease the tape width, and vice versa. Consequently, by modifying the tension applied to the tape medium, the tape drive unit brings the track spacing on the tape into better conformance with the read/write head spacing.

Due to manufacturing variabilities, and environmental conditions present during read and write operations, head spacing varies among different tape drive units, and even on a particular unit used at different times. Similarly, manufacturing variabilities and environmental conditions influence the spacing among tracks on the tape medium. Embodiments of the present invention account for, and compensate for the aforementioned variabilities, and consequently optimize the head-to-track alignment.

In some embodiments of the present invention, a closed-loop control system performs alignment measurements and responsive tension modifications, intermittently and/or continually, to maintain optimal track-to-head alignment.

A tape drive unit determines alignment accuracy among a plurality of read/write heads and a respectively corresponding plurality of tracks (servo tracks and/or data tracks) on the tape medium. The tape drive unit includes the alignment data in a dataset information table (DSIT) and writes the DSIT on the tape medium, in close proximity to the associated dataset being written to tape. (In some embodiments, the DSIT is inserted into the corresponding dataset.) A subsequent operation to read the dataset from the tape medium may be performed on a tape drive unit different from the unit that performed the write operation. The subsequent read operation may occur days, months, or even many years after the dataset was written. In conjunction with the subsequent read operation, the tape drive unit reads the DSIT associated with the original writing of the dataset, and modifies tension in the tape based on the alignment data included in the DSIT, to optimize head-to-track alignment.

The following is to be understood, with respect to embodiments of the present invention: (i) the terms "tape" and "tape medium" may refer to, and be applicable to, any physical storage medium; (ii) the term "tape drive unit" may refer to, and be applicable to, any read/write device associated with the physical storage medium; and (iii) the terms "read/write head", "read/write head assembly" and similar terms, may refer to, and be applicable to, any device for reading and/or writing information from and/or to the physical storage medium. As an example, an optical disk is analogous to a tape medium. The disk mounts in an optical disk drive, analogous to a tape cartridge mounded in tape drive unit. A laser optical assembly in the optical disk drive is analogous to a tape read/write head assembly. And expansion/contraction of the optical disk is analogous to expansion/contraction of the tape medium. The present invention may be embodied in many other storage systems while keeping within the scope and spirit of the present invention.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A method comprising:
receiving a plurality of data units from a host computer;
storing the plurality of data units in a buffer memory;
generating a plurality of data segments comprising a respectively corresponding plurality of subsets of the plurality of data units;
receiving a plurality of dataset information tables (DSITs) respectively corresponding to the plurality of data segments;
appending the plurality of DSITs to the respectively corresponding plurality of data segments, to create a plurality of datasets stored in the buffer memory;
determining a number of datasets, of the plurality of datasets stored in the buffer memory, exceeds a threshold value; and
in response to determining the number of datasets exceeds the threshold value, stopping the appending the plurality of DSITs to the respectively corresponding plurality of data segments.

2. The method of claim 1, further comprising:
in further response to determining a number of datasets, of the plurality of datasets stored in the buffer memory, exceeds the threshold value, writing the datasets onto a storage medium.

3. The method of claim 2, wherein the storage medium is a magnetic tape storage medium.

4. The method of claim 2, wherein each DSIT of the plurality of DSITs comprises information with respect to a dimensional characteristic of the storage medium.

5. The method of claim 4, wherein the dimensional characteristic of the storage medium is selected from the group consisting of:
a measure of tension applied to the storage medium;
a measure of expansion of the storage medium relative to a reference value;
a measure of contraction of the storage medium relative to the reference value; and
a composite measure of alignment between a plurality of tracks on the storage medium and a respectively corresponding plurality of read/write heads on a tape drive unit.

6. The method of claim 3, further comprising:
receiving a command to read a first dataset from the storage medium;
reading a first DSIT associated with the first dataset;
determining a present condition of the storage medium;
determining a correction factor, based at least in part on information in the first DSIT, and the present condition of the storage medium;
applying, to the magnetic tape storage medium, a tension setting based on the correction factor; and
reading the first dataset from the storage medium.

7. The method of claim 6, wherein determining the present condition of the storage medium comprises:
seeking optimal head assembly alignment with a plurality of servo tracks on the storage medium, wherein the head assembly comprises a plurality of read/write heads respectively corresponding to the plurality of servo tracks; and
determining a present condition of the storage medium based, at least in part, on a plurality of signal strengths coming from the respectively corresponding plurality of read/write heads.

8. A computer program product comprising a computer readable storage medium having stored thereon program instructions programmed to perform:
receiving a plurality of data units from a host computer;
storing the plurality of data units in a buffer memory;
generating a plurality of data segments comprising a respectively corresponding plurality of subsets of the plurality of data units;
receiving a plurality of dataset information tables (DSITs) respectively corresponding to the plurality of data segments;
appending the plurality of DSITs to the respectively corresponding plurality of data segments, to create a plurality of datasets stored in the buffer memory;
determining a number of datasets, of the plurality of datasets stored in the buffer memory, exceeds a threshold value; and
in response to determining the number of datasets exceeds the threshold value, stopping the appending the plurality of DSITs to the respectively corresponding plurality of data segments.

9. The computer program product of claim 8, further comprising:
in further response to determining a number of datasets, of the plurality of datasets stored in the buffer memory, exceeds the threshold value, writing the datasets onto a storage medium.

10. The computer program product of claim 9, wherein the storage medium is a magnetic tape storage medium.

11. The computer program product of claim 9, wherein each DSIT of the plurality of DSITs comprises information with respect to a dimensional characteristic of the storage medium.

12. The computer program product of claim 11, wherein the dimensional characteristic of the storage medium is selected from the group consisting of:
a measure of tension applied to the storage medium;
a measure of expansion of the storage medium relative to a reference value;
a measure of contraction of the storage medium relative to the reference value; and
a composite measure of alignment between a plurality of tracks on the storage medium and a respectively corresponding plurality of read/write heads on a tape drive unit.

13. The computer program product of claim 10, further comprising:
receiving a command to read a first dataset from the storage medium;
reading a first DSIT associated with the first dataset;
determining a present condition of the storage medium;
determining a correction factor, based at least in part on information in the first DSIT, and the present condition of the storage medium;
applying, to the magnetic tape storage medium, a tension setting based on the correction factor; and
reading the first dataset from the storage medium.

14. The computer program product of claim 13, wherein determining the present condition of the storage medium comprises:

seeking optimal head assembly alignment with a plurality of servo tracks on the storage medium, wherein the head assembly comprises a plurality of read/write heads respectively corresponding to the plurality of servo tracks; and determining a present condition of the storage medium based, at least in part, on a plurality of signal strengths coming from the respectively corresponding plurality of read/write heads.

15. A computer system comprising:

a processor set; and a computer readable storage medium;

wherein:

the processor set is structured, located, connected and/or programmed to run program instructions stored on the computer readable storage medium; and the program instructions include instructions programmed to perform:

receiving a plurality of data units from a host computer;

storing the plurality of data units in a buffer memory;

generating a plurality of data segments comprising a respectively corresponding plurality of subsets of the plurality of data units;

receiving a plurality of dataset information tables (DSITs) respectively corresponding to the plurality of data segments;

appending the plurality of DSITs to the respectively corresponding plurality of data segments, to create a plurality of datasets stored in the buffer memory;

determining a number of datasets, of the plurality of datasets stored in the buffer memory, exceeds a threshold value; and in response to determining the number of datasets exceeds the threshold value, stopping the appending the plurality of DSITs to the respectively corresponding plurality of data segments.

16. The computer system of claim 15, further comprising:

in further response to determining a number of datasets, of the plurality of datasets stored in the buffer memory, exceeds the threshold value, writing the datasets onto a storage medium.

17. The computer system of claim 16, wherein the storage medium is a magnetic tape storage medium.

18. The computer system of claim 16, wherein each DSIT of the plurality of DSITs comprises information with respect to a dimensional characteristic of the storage medium.

19. The computer system of claim 18, wherein the dimensional characteristic of the storage medium is selected from the group consisting of:

a measure of tension applied to the storage medium;

a measure of expansion of the storage medium relative to a reference value;

a measure of contraction of the storage medium relative to the reference value; and a composite measure of alignment between a plurality of tracks on the storage medium and a respectively corresponding plurality of read/write heads on a tape drive unit.

20. The computer system of claim 17, further comprising:

receiving a command to read a first dataset from the storage medium;

reading a first DSIT associated with the first dataset;

determining a present condition of the storage medium;

determining a correction factor, based at least in part on information in the first DSIT, and the present condition of the storage medium;

applying, to the magnetic tape storage medium, a tension setting based on the correction factor; and reading the first dataset from the storage medium.

* * * * *